United States Patent
Kaufman

(10) Patent No.: US 7,926,851 B2
(45) Date of Patent: *Apr. 19, 2011

(54) EXTENDED TAB LABEL WITH BACKING LINER

(75) Inventor: Stacy R. Kaufman, Sunrise, FL (US)

(73) Assignee: Scriptchek Visual Verification Systems, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 12/137,678

(22) Filed: Jun. 12, 2008

(65) Prior Publication Data

US 2008/0303264 A1    Dec. 11, 2008

Related U.S. Application Data

(63) Continuation of application No. 11/050,337, filed on Feb. 3, 2005, now Pat. No. 7,398,999, which is a continuation of application No. 10/297,262, filed on Dec. 3, 2002, now Pat. No. 6,860,513.

(51) Int. Cl.
*B42D 15/00* (2006.01)
*G09F 3/00* (2006.01)
*B42D 15/10* (2006.01)

(52) U.S. Cl. ............... 283/81; 283/71; 283/72; 283/101

(58) Field of Classification Search .......... 40/316; 118/221; 156/278, 289, 291; 215/DIG. 2; 283/72, 81, 82, 101, 21, 71; 428/191, 195, 428/198, 201; *G09F 3/02, 3/10, 7/02, 7/12*
See application file for complete search history.

(56) References Cited

U.S. PATENT DOCUMENTS

| | | | |
|---|---|---|---|
| 1,756,944 A | 5/1930 | Gorton, Jr. | |
| 1,949,903 A | 3/1934 | Fales | |
| 1,999,878 A | 4/1935 | La Bombard | |
| 2,194,220 A | 3/1940 | Elder | |
| 2,706,865 A | 4/1955 | Miller | |
| 3,077,684 A | 2/1963 | Gwinn | |
| 4,061,808 A * | 12/1977 | Sato | 283/101 |
| 4,312,523 A * | 1/1982 | Haines | 283/81 |
| 4,324,058 A | 4/1982 | Sherwick et al. | |
| 4,621,837 A | 11/1986 | Mack | |

(Continued)

FOREIGN PATENT DOCUMENTS

DE    3924790 A1    2/1991

(Continued)

*Primary Examiner* — Dana Ross
*Assistant Examiner* — Justin V Lewis
(74) *Attorney, Agent, or Firm* — Robert M. Schwartz; Alfred K. Dassler

(57) ABSTRACT

A pharmaceutical label for placement on a medicinal container, the label includes a front printing face having an adhesive backing and a length that is substantially greater than a perimeter of the medicinal container. The adhesive backing covers substantially an entire area of a backside of the front printing face. A backing sheet liner covers the adhesive backing. The front printing face has a first portion and a second portion. The first portion has a length corresponding substantially to the perimeter of the container. A border is between the first portion and the second portion. The border defines the length of the first portion. The backing sheet liner has a liner score line formed therein corresponding to the border for removing the backing liner from the first portion and for defining an intact portion of the backing liner on the second portion. The second portion projects from the container when the first portion is attached to the container. The first portion and the second portion have information thereon.

10 Claims, 12 Drawing Sheets

U.S. PATENT DOCUMENTS

| | | | |
|---|---|---|---|
| 4,671,003 A * | 6/1987 | Vitol | 40/638 |
| 4,850,613 A | 7/1989 | Instance | |
| 4,884,827 A * | 12/1989 | Kelley | 283/81 |
| 4,895,747 A * | 1/1990 | Birkholz et al. | 283/81 |
| 4,918,604 A | 4/1990 | Baum | |
| 5,056,827 A | 10/1991 | Sasso | |
| 5,207,746 A | 5/1993 | Jones | |
| RE34,366 E | 9/1993 | Instance | |
| 5,263,743 A | 11/1993 | Jones | |
| 5,342,093 A | 8/1994 | Weernink | |
| 5,472,756 A | 12/1995 | Sechet | |
| 5,484,170 A | 1/1996 | Hatfield, Jr. | |
| 5,597,995 A | 1/1997 | Williams et al. | |
| 5,601,314 A | 2/1997 | Burns et al. | |
| 5,645,300 A | 7/1997 | Hill | |
| 5,676,401 A | 10/1997 | Witkowski | |
| 5,727,819 A | 3/1998 | Grosskopf et al. | |
| 5,752,723 A | 5/1998 | Robertson | |
| 5,905,652 A | 5/1999 | Kutsuma | |
| 5,951,076 A | 9/1999 | Marco | |
| 5,960,947 A | 10/1999 | Dimelis et al. | |
| 6,021,942 A | 2/2000 | Monico | |
| 6,036,017 A | 3/2000 | Bayliss, IV | |
| 6,125,563 A | 10/2000 | Girerd | |
| 6,162,158 A | 12/2000 | Mercer et al. | |
| 6,550,171 B1 | 4/2003 | DeWerra et al. | |
| 6,613,410 B1 | 9/2003 | Sellars | |
| 6,733,855 B1 | 5/2004 | Scott | |
| 6,857,801 B2 | 2/2005 | Van Beaver | |
| 6,860,513 B2 | 3/2005 | Kaufman | |
| 2002/0185856 A1 * | 12/2002 | Hanefeld et al. | 283/71 |
| 2004/0007557 A1 | 1/2004 | Maliszewski et al. | |
| 2004/0033099 A1 | 2/2004 | Van Bever | |
| 2004/0075272 A1 | 4/2004 | Kaufman | |

FOREIGN PATENT DOCUMENTS

| | | |
|---|---|---|
| EP | 1369252 A2 | 12/2003 |
| FR | 001043230 | 11/1953 |
| GB | 2277075 A | 10/1994 |

* cited by examiner

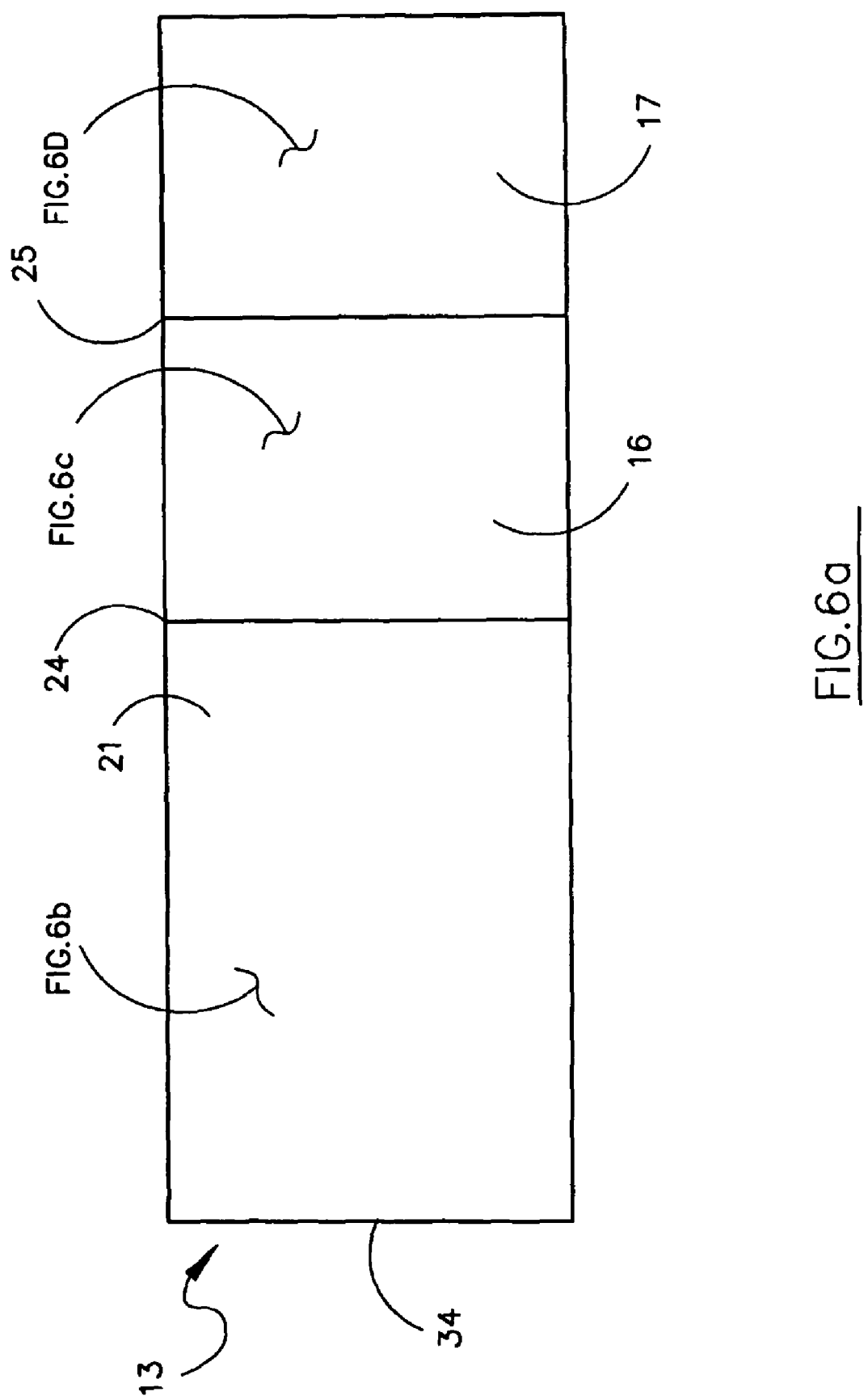

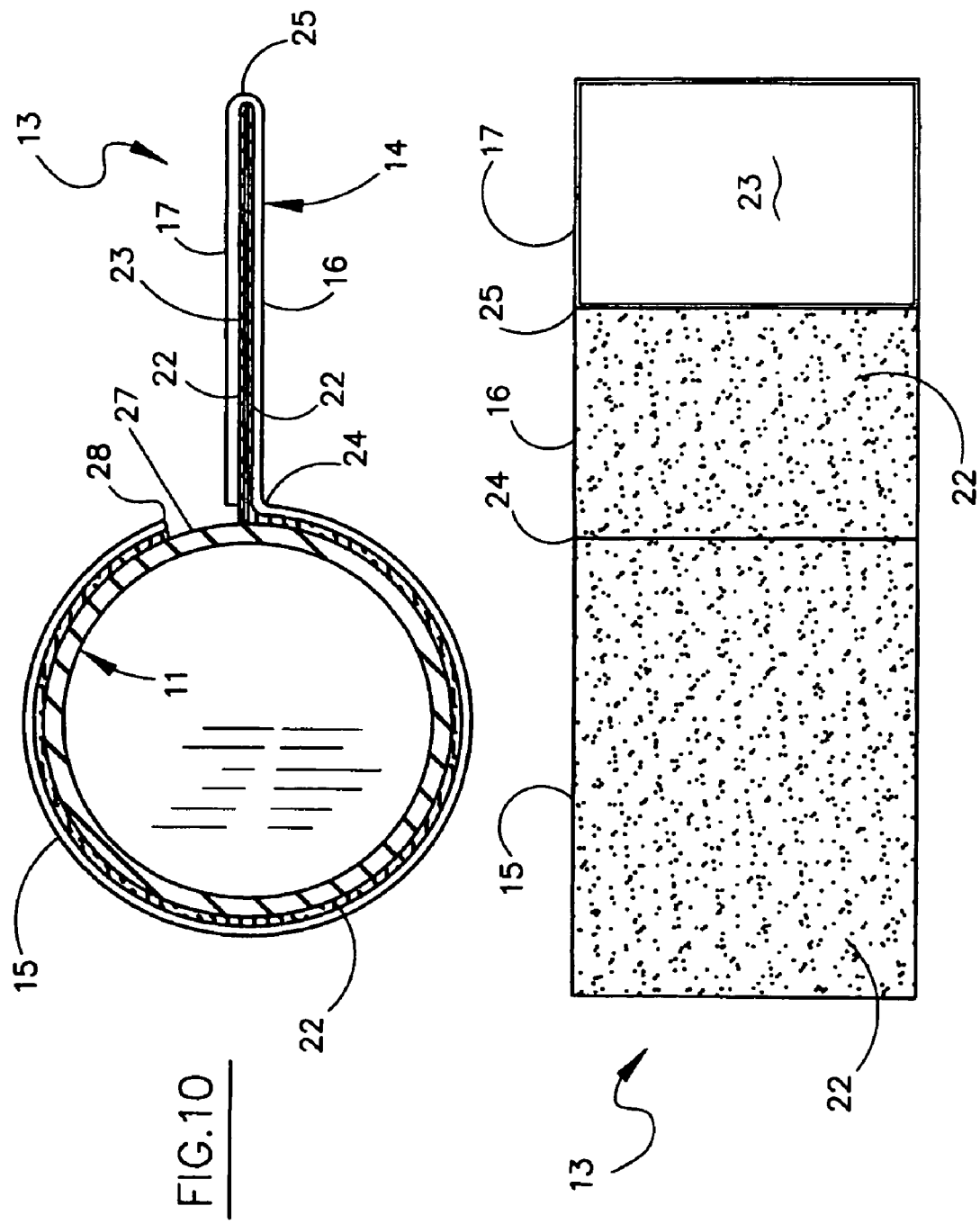

EXTENDED TAB LABEL WITH BACKING LINER

CROSS-REFERENCE TO RELATED APPLICATIONS

This application claims the benefits of U.S. Non-Provisional Application Ser. No. 11/050,337 filed Aug. 28, 2003, entitled VERIFICATION OF PRESCRIPTION INFORMATION AND WARNING LABEL, which claims the benefit of U.S. Non-Provisional application Ser. No. 10/297,262 filed Dec. 3, 2002, which claims the benefit of PCT/US2001/018713 filed Jun. 8, 2001, which claims the benefit of U.S. Provisional Application No. 60/210,321, filed on Jun. 8, 2000, entitled VISUALLY ACCURATE PRESCRIPTION MEDICATION LABEL.

BACKGROUND OF THE INVENTION

In the pharmaceutical industry, medicines and drugs are dispensed by a pharmacist to consumers. Typically, these medicines and drugs are made by a manufacturer. A physician generally writes a prescription to the patient/consumer who takes the prescription to the patient's pharmacist where the prescription is filled.

This invention is primarily directed to those medicines and drugs that are ingestible, that are dispensed in a pill and tablet form, or a liquid. Generally, pills and tablets come in a myriad of shapes and colors, some with markings thereon from the manufacturer, and liquids also come in colors. These markings represent information and may include numbers, letters, color and other indicia, etc.

Additionally, at the time of filling the prescription additional information is provided to the patient/consumer regarding information, warnings and directions regarding use of and taking of the prescribed medicine (hereinafter information). It is desirable to attach this information to the container for the medication for the patient, and it has now become a requirement in some states for this information to appear and be affixed to the container of the medication. This information is specific to the patient and to the dispensed medication. Therefore the information can only be determined at the time of dispensing the medication to the patient. The filler of the prescription, e.g. the pharmacist or the pharmacist's technician, must make the determination of the disclosed information at time of filling the prescription. However there is more information required than there is space on the container to place said information in a visually readable format and manner to satisfy the current laws and/or regulations. Additionally, new regulations will require laws and manufacturers of medicines desire to place more information on the container label.

These prescription labels are typically placed on a cylindrical medicine container having a replaceable top which typically screws on or snaps on to the container to seal it. The containers are often called vials and are of a variety of sizes, a common size is nine (9) drams. For this size vial a typical label has an adhesive backing and is three and one quarter (3¼) inches wide and two (2) inches tall.

Pharmacies are also verifying prescription medications more often to reduce medical errors that occur in the fast paced world of drug dispensing. It is believed that time constraints prevent pharmacists from implementing more error-prevention procedures.

The present invention, a label format, offers an information tab providing additional informational space that will allow the pharmacist, pharmacy technicians and the consumer to visually verify that the medication prescribed is exactly what it is supposed to be. This provides the fastest, easiest system to reduce errors where errors are unacceptable.

The present invention solves problems associated with drug dispensing; wrong dosage, wrong drug given, wrong route of administration, failure to warn patients of potential hazards and proper instructions on use. This removes any inhibitions of implementation of medication error-prevention procedures, satisfying the work overload and constant time pressures in today's pharmacies and hospitals.

The enlarged label format of the present invention provides legibility of the medication specifics; visual verification for accuracy in medication; visual representation may satisfy current OBRA 90 laws (4) on verbally informing the patient of the medication they are receiving; specific clock designation for accurate use of medication; simplifies the Warnings and Indications labeling required for each individual medication; flexibility for multiple languages; NDC code number for obtaining all of the specific properties of the medication; UPC bar code for confirming drug medication for verification procedures as well as constant inventory management for a controlled substance; enhances product compliance features; and is a solution for error-prevention procedures in medication dispensing.

Pharmacists use pharmacy systems to check, verify and recheck that the proper medicine/drug prescribed is actually filled into the container. These systems may be manual, written or have been practiced for years and may be paper systems or computerized systems. However, what is lacking is a way for a consumer, typically the patient, to make their own verification that the proper medicine has been dispensed.

In the prior art of pharmaceutical labels it is known to use laser print forms such as those sold by Pharmex, of New Smyrna Beach, Fla. These type of forms provide a pharmaceutical label attached at the top of a sheet of paper, generally 8½ inches by 11 inches, that is capable of being loaded into a sheet fed printer, such as a laser printer or ink jet printer, known in the art and which are sheet fed, one at a time from a stack of preloaded sheets in the printer. The pharmaceutical label is then printed on by the printer. Thereafter, the label contains the prescription and other information. The label is then peeled off and placed on a medicine container by the pharmacist or the pharmacist's assistant. Typically, these labels are placed around the circumference of the container and have, when attached to the sheet of paper, a pressure sensitive backing to allow the label to be peeled from the sheet of paper and then attached by the adhesive to the container. However, the labels are limited to attachment directly to the container and there is no provision for an information tab as in the present invention.

U.S. Pat. No. 5,601,314 provides a label that requires multiple folds and layers to be attached to the container. Specifically, by removing the top face 22, record 26 is detached for placement on a record keeping log and portion 28 is likewise removable by the patient. This teaches away from the present invention by not keeping all record information visible with the container.

The present invention does not require multiple layers of the label to be attached to the container as shown in FIG. 5.

U.S. Pat. No. 5,056,827 provides a manufactures' label for use to be affixed by a drug manufacturer as a description and instruction label for the pharmacist. It generally requires pre-printing on both sides of the label sheet. It is intended to be removed to leave space for affixing the pharmacy's own standard type of prescription label. The present invention does not require printing on both sides of the label which would require an extra step. The '827 label is preassembled and pre-folded label by a label machine and is not folded by hand.

U.S. Pat. No. 4,324,058, discloses a label for undersized containers, that wraps around the container and adheres one end of the label to the other end of the label, without regard to the actual circumference of the container being used. This label requires printing on the label to correspond to the container size. It also requires an exact alignment of the two loose ends so that there is no exposed adhesive. This patent requires a determination of a middle point of the label for accurate alignment, not required in the present invention. Likewise the present invention allows for easier attachment of the label.

U.S. Pat. No. 4,312,523 discloses a pharmaceutical label, having a pull tab 18 for tearing off a first and second detachable section of the label. This is contrary to the present invention which does not require removal of a part of the label.

U.S. Pat. Nos. 5,645,300, 5,727,819, 5,263,743, Re. 34,366, 5,472,756, and 4,621,837 are all preprinted self adhesive labels, printed one at a time, and are printed at or about the time of dispensing the medicine in the container.

U.S. Pat. No. 1,756,944 is a two sided label, and U.S. Pat. No. 3,077,684 a luggage tag label, is similar to U.S. Pat. No. 4,324,058 that has a center portion with no adhesive and two loose ends that must be placed together.

U.S. Pat. No. 6,036,017 discloses a label bearing a visual photographic image of a pill. However, Bayliss does not teach extending his label for additional information as in the present invention. Presumably because of space limitations he can not include multiple views of the pill as in the present invention.

SUMMARY OF THE PRESENT INVENTION

The present invention is a unique prescription label that allows a consumer to check and verify the accuracy of the prescribed medication as well as to provide additional information on the medication container by increasing the usable size and area of the prescription label. Furthermore, the present invention provides a means for easy application of the prescription label onto the container.

The present invention is an apparatus and method to provide sufficient space on a label to allow a consumer to be clearly informed and be able to recognize and validate the image of prescribed medicine, the dosage amount, the prescribed brand, how to take the medicine, when to take the medicine, the drug manufacturer, possible side effects of the medicine, information on the time to take the medication and to receive other information and warnings about the prescribed medicine and the prescription.

The present invention provides an independent means for the consumer to verify that the proper medicine has been dispensed. Specifically, one part of the invention is that it allows the consumer to visually verify that the type of pill or tablet named on the prescription label has in fact been dispensed. This visual verification uses an actual photograph of the medicine, and/or an imprint or drawing or other facsimile to depict the actual drug dispensed in the container. This will allow the pharmacist and the consumer an easy means to verify that the proper medicine has been dispensed to the patient. This additional complete information and warnings can be placed on the prescription label because of the increased size of the said label.

The pharmacist will receive information from the physician to fill the prescription. This may be in the form of a written "prescription" given to the pharmacist or the "prescription" may be delivered to the pharmacist electronically or by some other method, outside the scope of this invention. Typically the pharmacist will enter the information from the prescription into the pharmacist's computer or system. A label for placement on the medicinal container will be created. The system computer will print out the label to be placed on the container for the medicine.

The present invention provides a method for the consumer to visually compare the dispensed medicine with written information and visual photographic or image information of the dispensed medicine. The present invention provides the space and unique location for written and visual information to be placed on the label, for the consumer to visually compare and verify that the proper medicine is within the container, by comparing the actual dispensed medicine to the identification of the medicine contained on the label.

Specifically, the pharmacist will enter information from the prescription and the identification of the medicine to be dispensed, to fill the prescription. This information will be used for printing of the label and will be used to identify the prescribed medicine.

The pharmacist's database of information will have separate information which may be obtained directly from the manufacturer or provider or other information provider, regarding the dispensed medicine. This said database will link the description of the medicine that the pharmacist entered into the pharmacist's computer with the information from the data base for the prescribed medicine. Then on a separate portion of the label, a written description of the dispensed medicine, e.g., the physical format of the medicine and attributes of the physical characteristics of the medicine, along with a photograph or image of the medicine, will be printed on the label, preferably the tab portion that extends from the container for the medicine.

Additionally, warning information and other information can now be provided on the label and the information tab of the present invention. It being understood that information and warnings can be placed anywhere on the entire label. Additional information printed on the label includes the doctor's instructions and information as well as common information input by the pharmacist if desired based on the pharmacist's professional responsibilities and according to the patient's requirements.

One piece of visual information may include one or more clock icons, that show the specific time for taking of the medication as prescribed.

BRIEF DESCRIPTION OF THE DRAWINGS

FIG. 10 is a fourth alternate embodiment shown in a sectional view similar to FIG. 2 that would be taken along lines 2-2 from FIG. 1.

FIG. 11 is a rear view of the label of the fourth alternate embodiment of the present invention, corresponding to FIG. 10.

DETAILED DESCRIPTION OF THE PREFERRED EMBODIMENT

Figure 1:
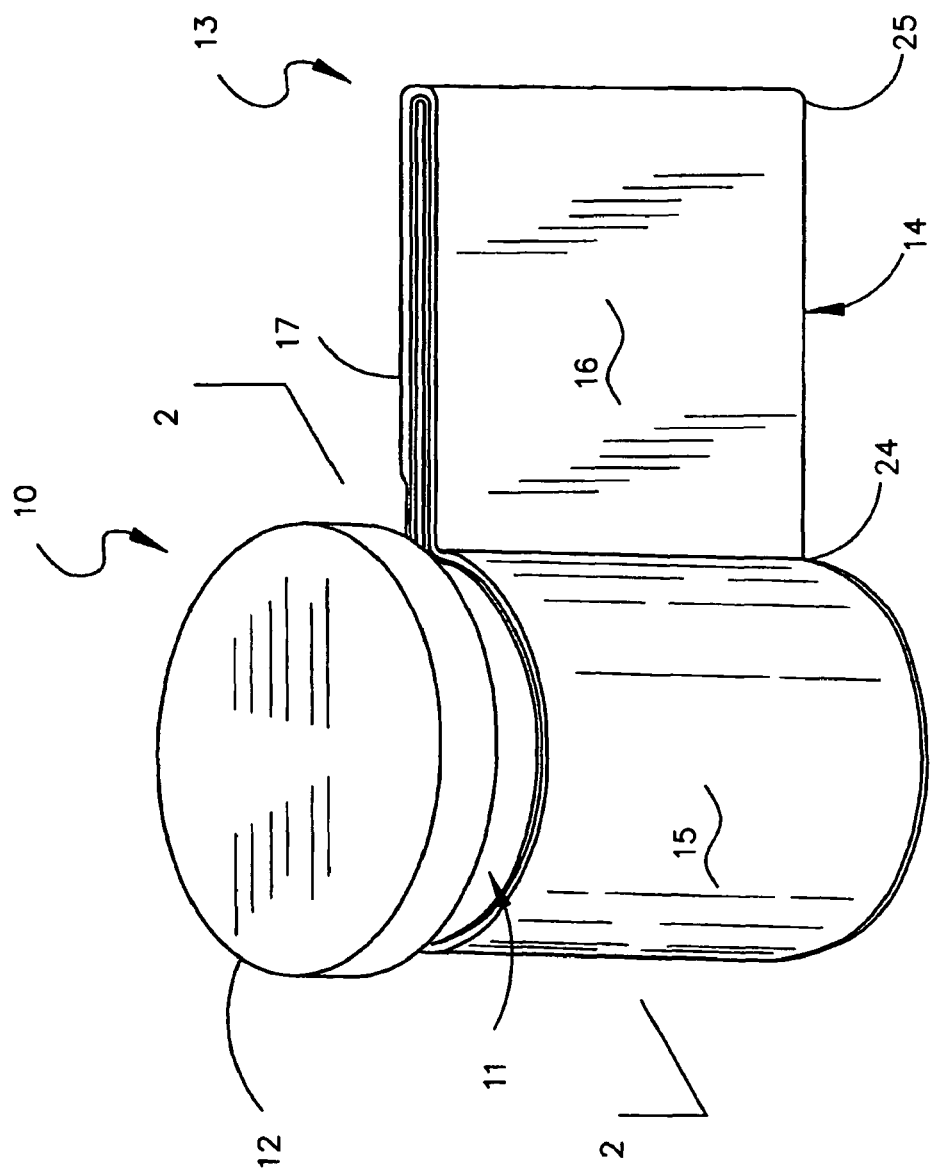
FIG. 1 is a perspective view of a cylindrical medicine container having the prescription label of the present invention attached thereto.

Referring to FIG. 1 is a cylindrical medicinal container 10 with the label of the present invention. Container 11 is a vial for containing medication such as pills and tablets dispensed by a pharmacist or other dispenser of such medicines. Container 11 includes a removable closure in the form of a cap 12 which is attached in ways known in the art.

A prescription label 13 is attached to container 11 and contains printed thereon typical information about the patient and medicine. Label 13 is wrapped around container 11, preferably along the length of label 13. A typical label in the prior art is 3¼ inches wide and 2 inches high. The label of the present invention is 8⅜ inches wide and 2 inches high, providing additional label area to display printed information. The additional label area is created by an informational tab 14, that projects radially from the container 11.

Label 13 has a first portion 15, a second portion 16 and a third portion 17. In the preferred embodiment, portion 15 is three and one quarter inches (3¼) wide and two (2) inches in height. Portion 16 is two inches nine sixteenth's (2 9/16) inches wide by two (2) inches in height. Portion 17 is two inches nine sixteenth's (2 9/16) inches wide by two (2) inches in height.

Figure 14:
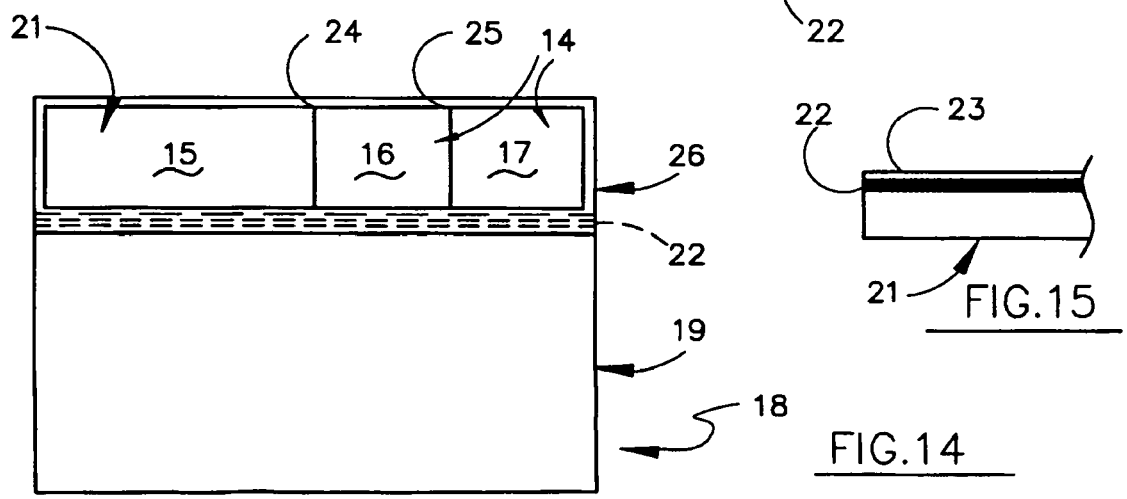
FIG. 14 is a front view of a laser dual-web form label combination sheet.
Figure 15:
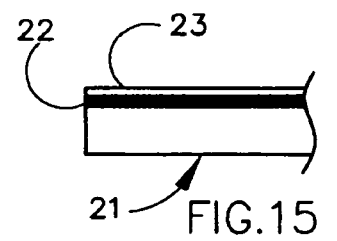
FIG. 15 is a partial sectional view of FIG. 14.

A typical prescription label as presently known in the art, is printed on a laser dual-web form label combination sheet 18 that joins two materials together, the label portion and the paper portion 19. When joined together form an 8½ inch by 11 or 8½ by 14 inch sheet. At the top of this sheet, as shown in FIG. 14 is the label 13. This blank label 13 includes a face sheet 21, an adhesive 22 and a backing sheet liner 23.

Typically the material of face sheet 21 is for example 50 pound bond paper material. Backing sheet liner 23 is of 50 pound silicon lined or other material backing sheet liner. Adhesive 22 is between face sheet 21 and silicon liner 23. Adhesive 22 remains attached to the back of face sheet 21.

The present label sheet as described is eight and three eighths (8⅜) inches wide with a one sixteenth (1/16) inch margin on both sides. In the present invention, vertical scoring lines 24 and 25 are front scored on the front of face sheet 21. Referring to FIG. 14, area 26 is a three sixteenth (3/16) inch overlap of pressure sensitive and bond materials joined by a glue line, known in the art.

Figure 2:
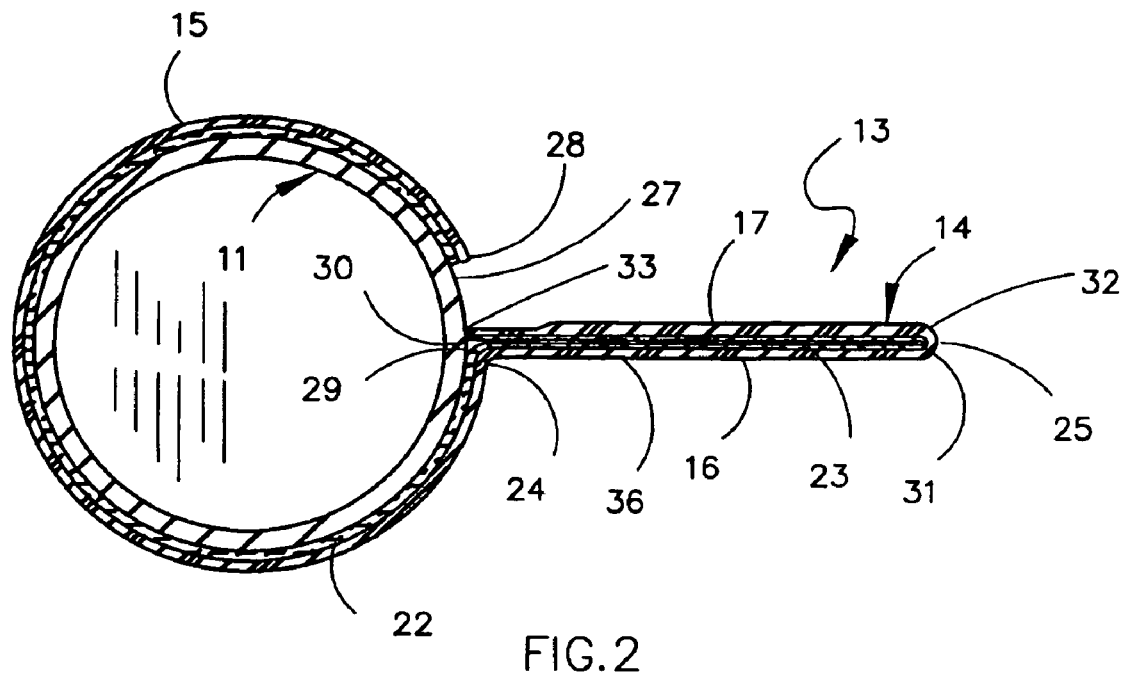
FIG. 2 is a sectional view taken along lines 2-2 from FIG. 1.

Referring to FIGS. 1 and 2, it can be seen that the circumferential width of first portion 15 is slightly less than the entire circumference of container 11 and thus a gap 27 is created between first end 28 of first portion 15 and second end 29 of first portion 15. Gap 27 defines at least a circumferential portion of container 11 without a portion of label 13 attached thereto. Depending on the size of container 11, the circumference of each container may vary. Thus gap 27 will vary based on the size of the container. It is preferable that the first portion 15 of continuous label 13 not overlap itself, so that first end 28 is not overlapped by second end 29, which would either obliterate a portion of the face of first portion 15 or otherwise make it inoperable.

Between first portion 15 and second portion 16 is a vertical score 24 substantially parallel to second end 29. It is preferred that score 24 and second end 29 are the same line. Likewise second portion 16 includes a second portion first end 30, which may be the same as second end 29 and a second portion second end 31.

A second vertical score line 25 is between second end 31 and third portion first end 32. Third portion second end 33 is at the end of third portion 17. Label 13 has a first end 34 and a terminal end or second end 35.

Figure 7:
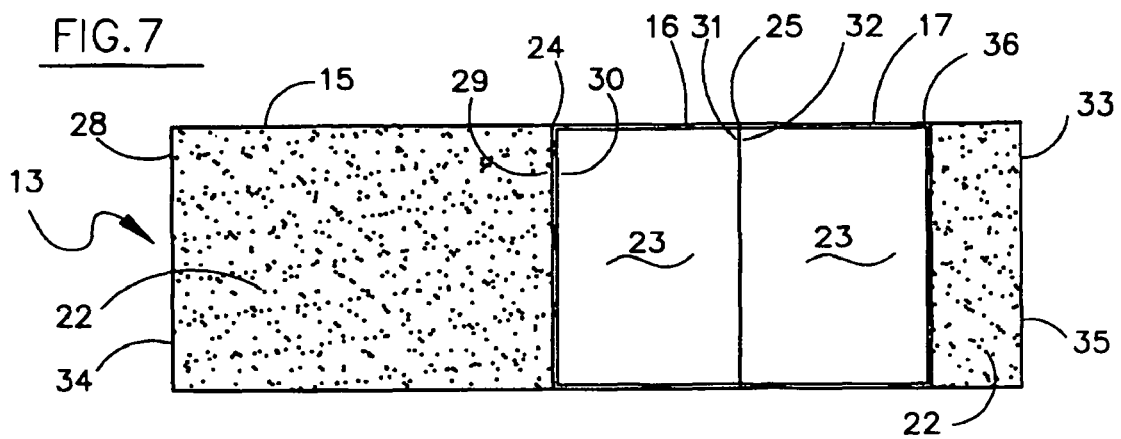
FIG. 7 is a rear view of the label of FIG. 6, with the top side on the bottom of the view, corresponding to FIGS. 1 and 2.

A preferred embodiment of the invention is shown in FIGS. 2 and 7, where, first portion 15 is adhesively attached along a circumferential portion of container 11. Score line 24, allows for a fold of label 13 such that second portion 16 extends radially from container 11. Third portion 17 folds back at score line 25 onto second portion 16. Third portion 17 can be adhesively attached to second portion 16. In this embodiment, and referring to FIG. 7, the back liner 23 of first portion 15 will have been removed to expose adhesive 22, such that portion 15 will adhere to container 11. The back liner 23 portion of second portion 16 will remain in place, providing stiffness to second portion 16 and to tab 14. In addition, when back liner 23 remains on second portion 16, at score 24, an accurate line and fold is created between first portion 15 and second portion 16, so that the only portion of label 13 in the vicinity of score 24 that adheres to container 11 is first portion 15. This allows for easy application of label 13 to container 11 by the pharmacist or applicator, such that attention need not be directed to where the fold at score 24 will occur on label 13, since in the vicinity of score 24 no part of second portion 16 will adhere to container 11 when said back liner 23 remains attached to second portion 16.

Figure 6B:
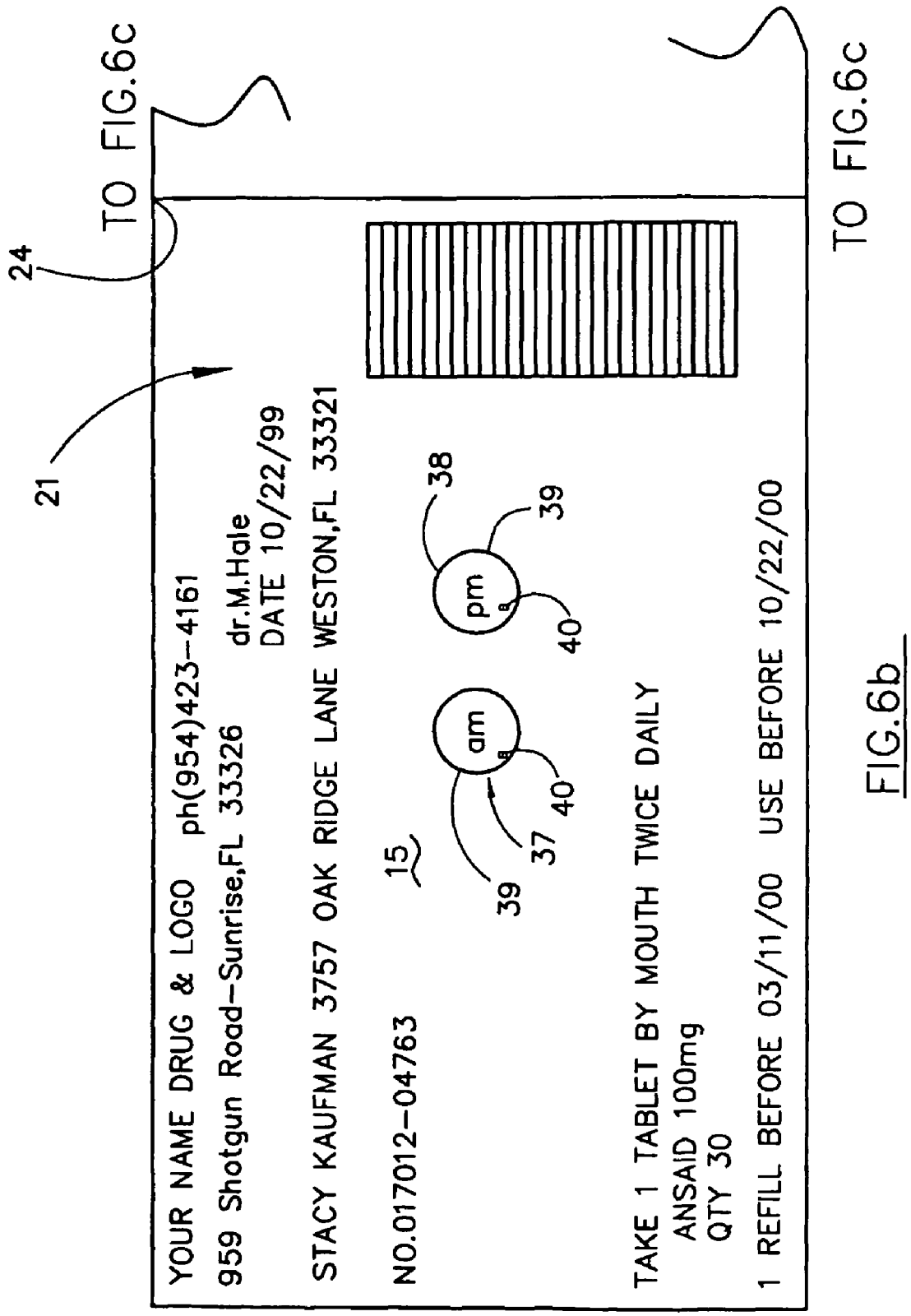
FIG. 6 is a view of the front side of the label of the present invention, corresponding to FIGS. 1 and 2.
Figure 6C:
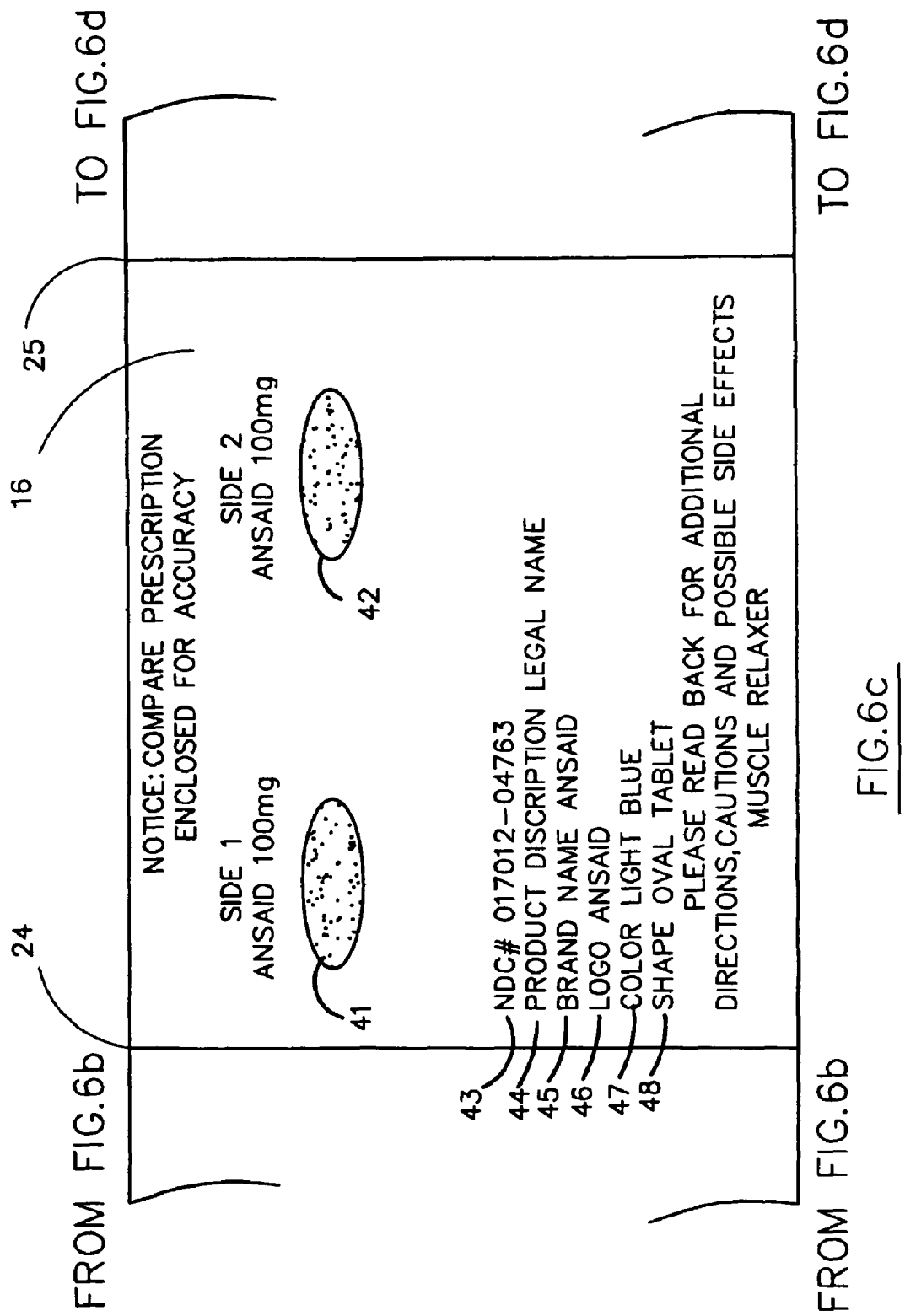
Figure 6D:
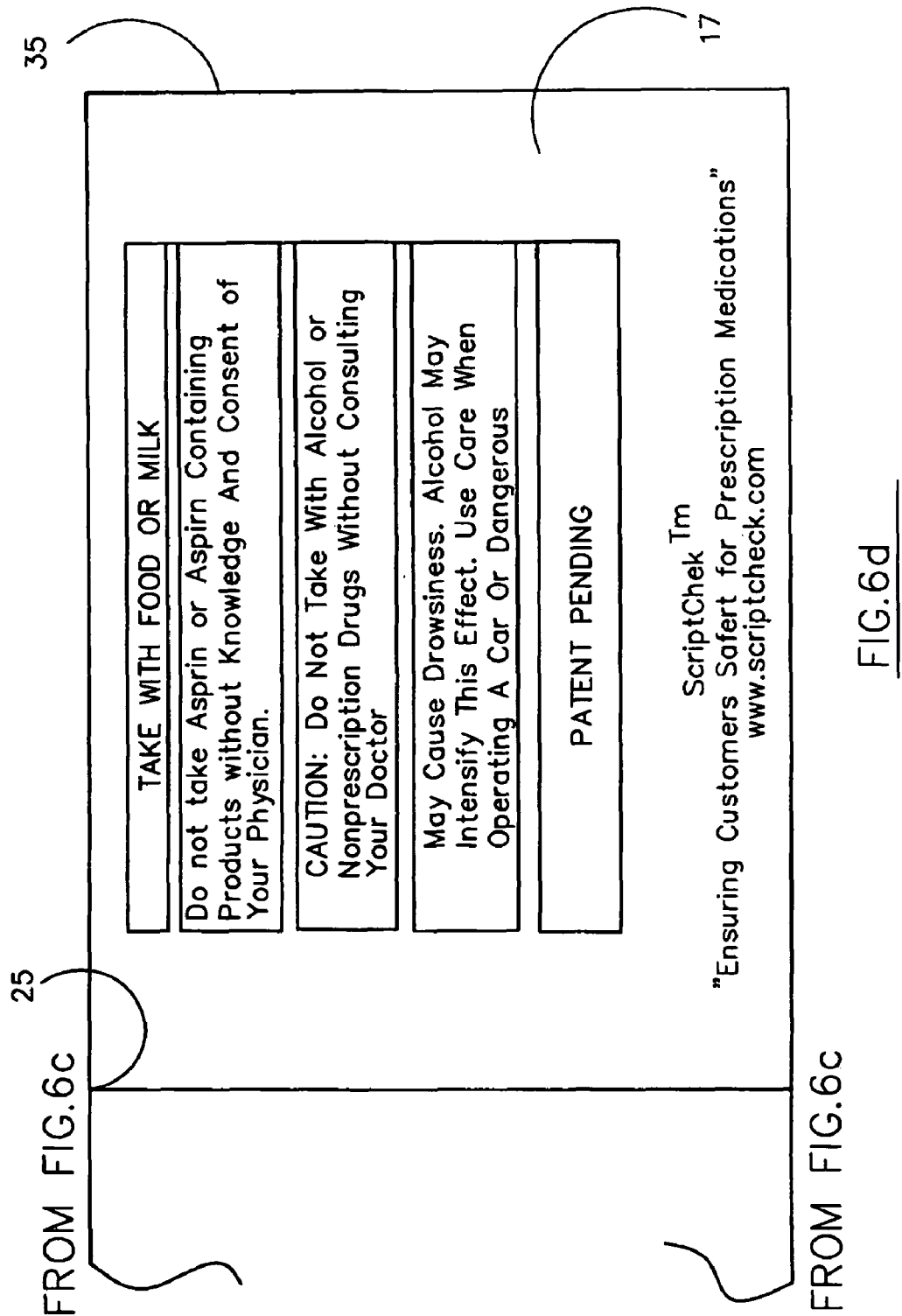

As shown in FIG. 7 back liner 23 portion of third portion 17 extends a portion of said third portion 17 from first end 32 to an intermediate distance 36 between the ends of third portion 17. The remaining portion of back liner 23 attached to third portion 17 provides stiffness to this said third portion 17 and to Tab 14. This exposes a portion of adhesive 22 on the back of third portion 17. This adhesive portion attaches third portion 17 to the back liner 23 of second portion 16 as shown in FIG. 2. This creates information tab 14 appearing to have information on both sides of said tab 14. This arrangement displays information on both sides of tab 14 even though the printing of said information is printed on only the face sheet 21, the front side of label 13. As shown in FIG. 1 and FIG. 6, the information displayed in the panel of first portion 15 is displayed circumferentially on container 11, the information displayed in the panel of second portion 16 is displayed on a first side of tab 14, and the information displayed in the panel of third portion 17 is displayed on a second side of tab 14 (best seen in FIG. 2).

Figure 4:
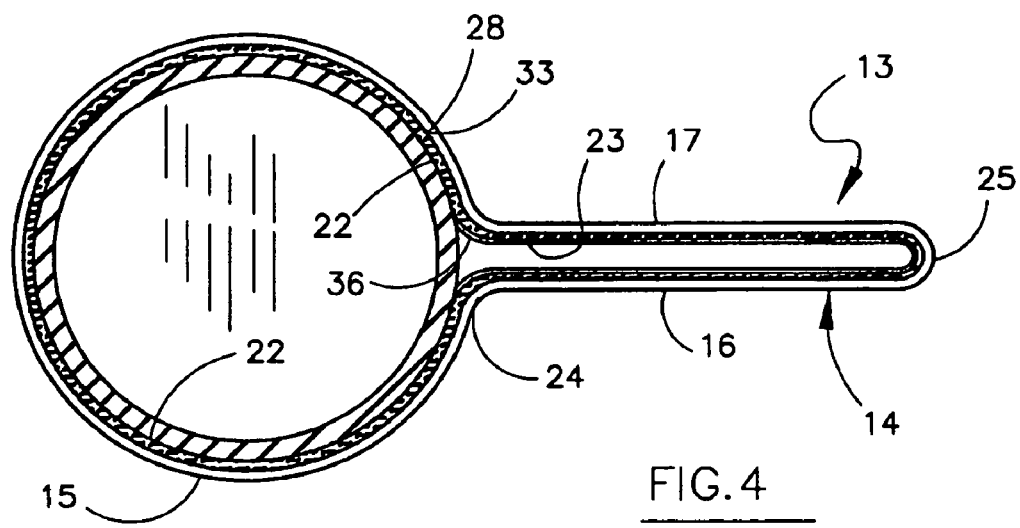
FIG. 4 is a second alternate embodiment shown in a sectional view similar to FIG. 2 that would be taken along lines 2-2 from FIG. 1.

The embodiment shown in FIG. 4 is similar to the embodiment described and shown in FIG. 2, however the adhesive 22 of third portion 17 is attached to container 11 preferably within gap 27. The back view of label 13 for this embodiment is also as shown in FIG. 7.

Figure 3:
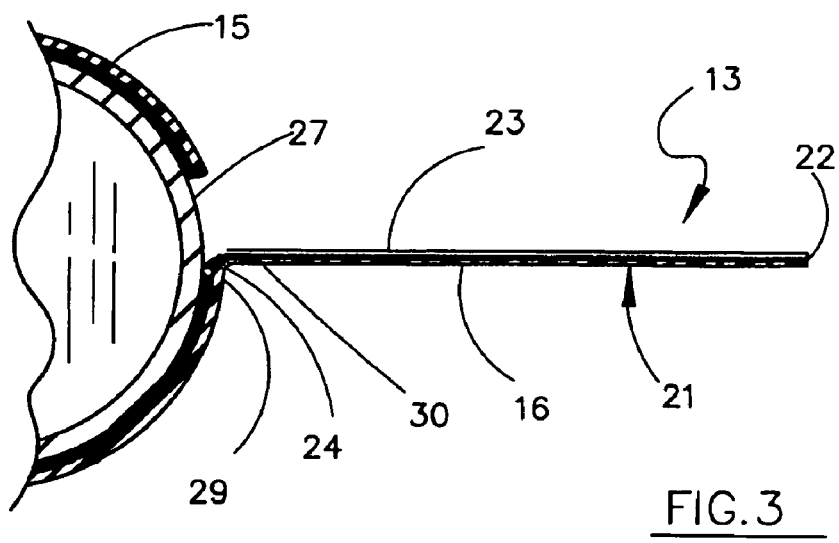
FIG. 3 is an alternate embodiment shown in a sectional view similar to FIG. 2 that would be taken along lines 2-2 from FIG. 1.
Figure 8:
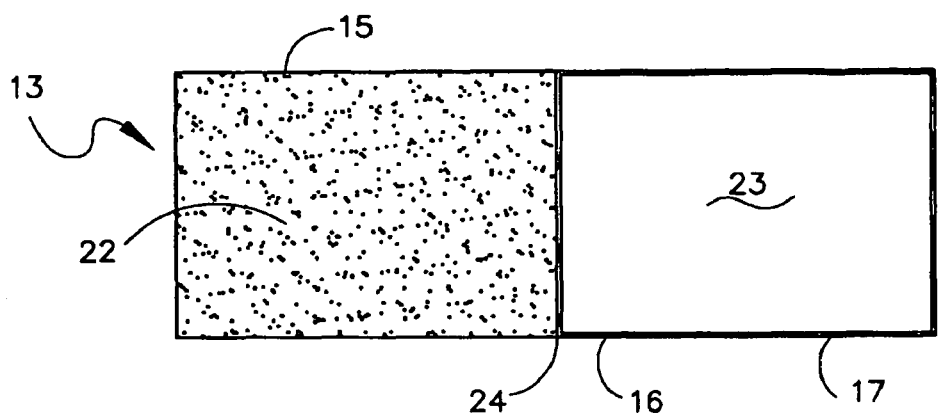
FIG. 8 is a rear view of the label of the first alternate embodiment of the present invention, corresponding to FIG. 3.

The embodiment shown in FIG. 3 corresponds to the back view of label 13 shown in FIG. 8. In this embodiment, back liner 23 remains intact on second portion 16 and third portion 17. This provides stiffness to information tab 14. In this embodiment, writing only appears on one side of information tab 14. Depending on the manufacture of the label portion 20 of dual web form 18, score 25 may be omitted. In this embodiment, second portion 16 and third portion 17 may be considered to merge as a single second portion 16.

Figure 5:
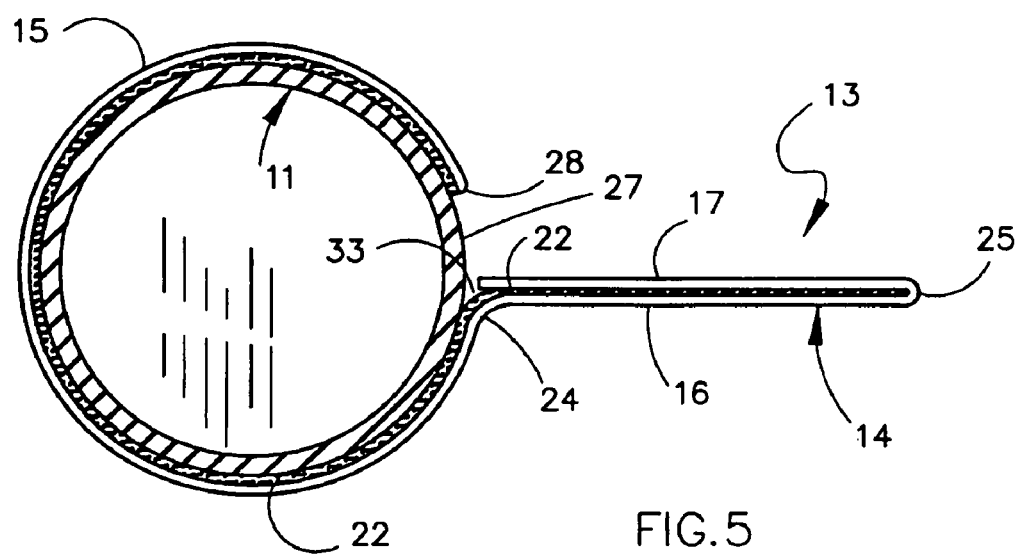
FIG. 5 is a third alternate embodiment shown in a sectional view similar to FIG. 2 that would be taken along lines 2-2 from FIG. 1.
Figure 9:
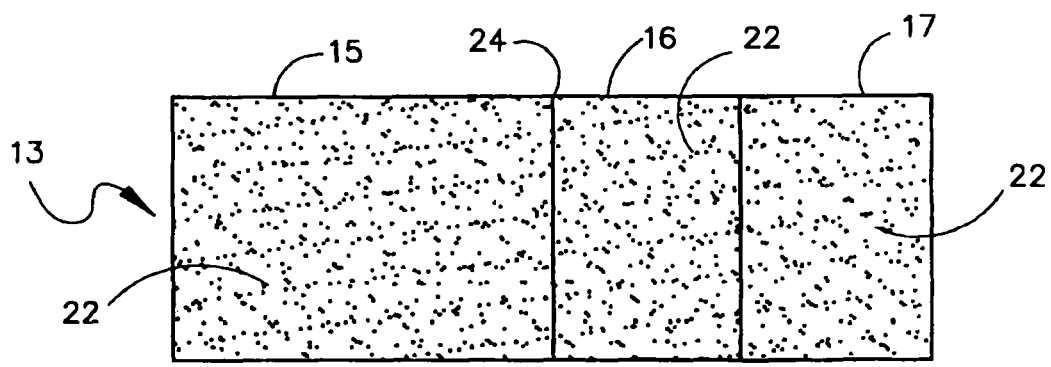
FIG. 9 is a rear view of the label of the third alternate embodiment of the present invention, corresponding to FIG. 5.
Figure 12:
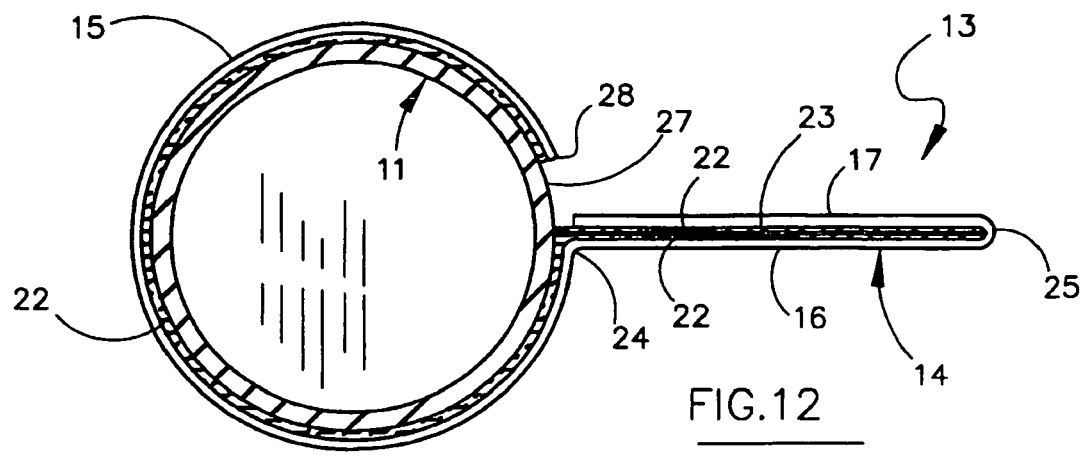
FIG. 12 is a fifth alternate embodiment shown in a sectional view similar to FIG. 2 that would be taken along lines 2-2 from FIG. 1.

The embodiment shown in FIG. 5 corresponds to the back view of label 13 shown in FIG. 9. In this embodiment, back liner 23 has been removed from the entire portion of label 13. Score lines 24 and 25 remain intact on label 13. A Third portion 17 is folded back onto second portion 16 forming information tab 14. An element of stiffness is achieved by the attachment of second portion 16 to third portion 17. As shown if FIG. 5, and discussed above, information appears on both sides of tab 14 though printing has been on only one side of label 13.

In use, after the pharmacist or technician enters the prescribed medication for the patient into the pharmacist's system, a label 13, on a label sheet such as dual web form 18 or by other label means outside the scope of this invention, is generated by a printer. The label 13 is printed on one side, on the front of face sheet 21. During printing the back liner 23 with a silicone covering remains on label 13 by adhesive 22. After printing, label 13 is applied to container 11. First, a portion of removable back liner 23, corresponding to first portion 15, is peeled off label 13, exposing adhesive 22 corresponding to first portion 15. In this preferred embodiment, during the manufacture of the label portion of form 18, back liner 23 is rear cut at vertical score line 24 and at an intermediate distance 36, additional back cuts are horizontally at top and bottom between 24 and 36 to first allow the removal of liner 23 from the rear of first portion 15, while leaving back liner 23 on second portion 16 and third portion 17. During the manufacture of said form 18 a rear score is made at score 25 to enable third portion 17 to fold easily back onto second portion 16. Though outside the scope of this invention, as known in the art, additional front cuts would be made around edge borders of label 13.

First portion 15 is applied circumferentially around an on to container 11 so that first portion 15 adheres to container 11. Since back liner 23 remains on second portion 16, no part of second portion 16 in the vicinity of score 24 will adhere to container 11, thus creating a substantially straight and even fold line between portion 15 and portion 16. Portion 16 will extend radially from container 11 and portion 17 will fold at score 25 back onto portion 16. Prior to folding portion 17 onto portion 16, the liner 23 will be removed at intermediate distance 36 to the end 35 of label 13 so that the exposed adhesive 22 of portion 17 will adhere to back liner 23 of portion 16.

Figure 13:
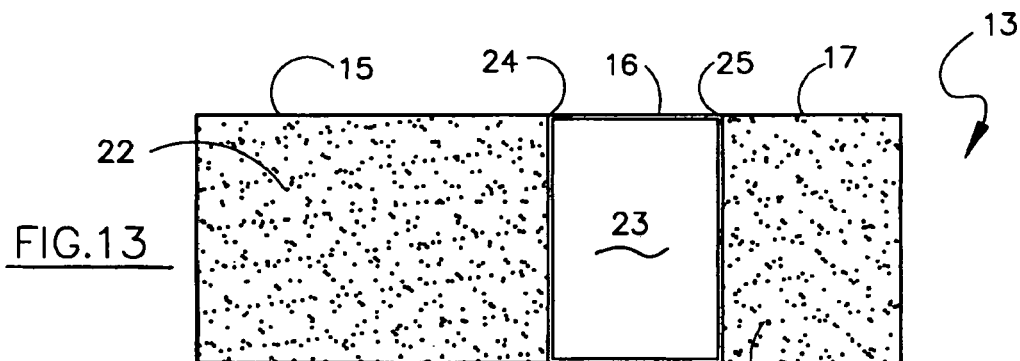
FIG. 13 is a rear view of the label of the fifth alternate embodiment of the present invention, corresponding to FIG. 12.

The alternative embodiments in FIGS. 11 and 10 and FIGS. 13 and 12, show alternate ways of folding third portion 17 back on second portion 16. FIG. 13 shows second portion 16 with back liner 23 in place as heretofore described. FIG. 11 shows third portion 17 with back liner 23 in place. In this embodiment, in order to allow the fold at score 24 to be even and to have first portion 15 fold even on said score 24, third portion 17 is folded onto second portion 16 prior to completing the application of first portion 15 to container 11.

Figure 18:
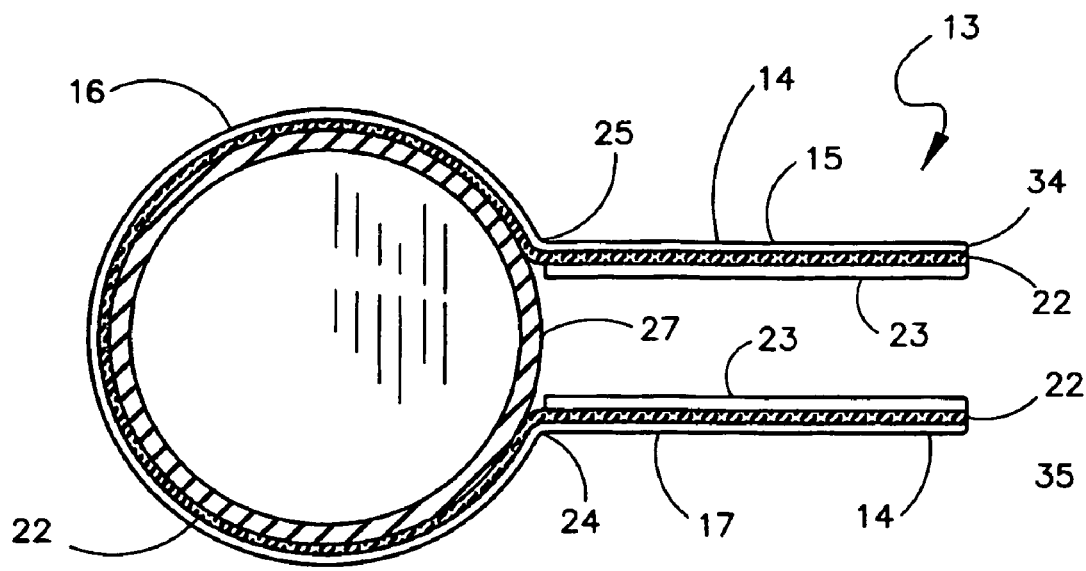
FIG. 18 is a seventh alternate embodiment shown in a sectional view similar to FIG. 2 that would be taken along lines 2-2 from FIG. 1.
Figure 19:
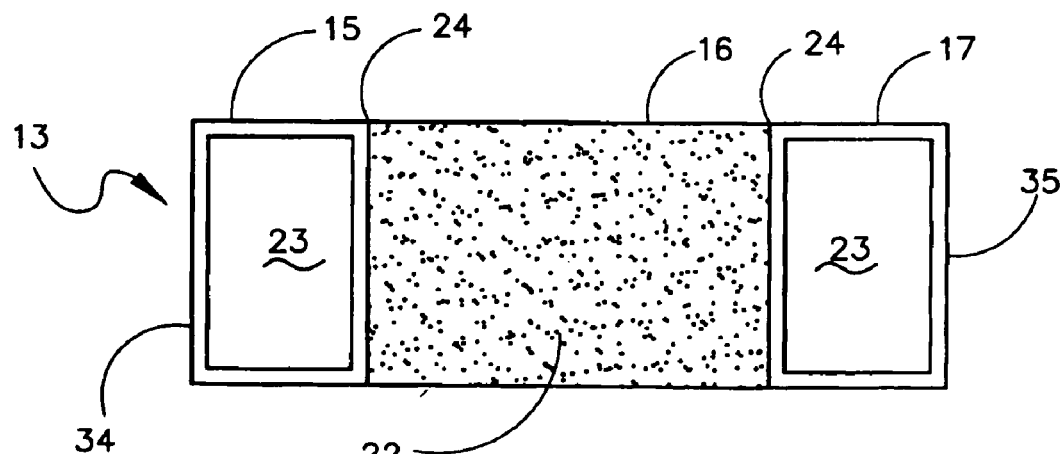
FIG. 19 is a rear view of the label of the seventh alternate embodiment of the present invention corresponding to FIG. 18.

FIG. 18 shows another alternate embodiment where no parts of the entire label 13 connect to one another. Further, there are two informational tabs 14 and 14 prime, each extending radially from the container 11. As seen in FIG. 19 the arrangement of the back liner 23 is, that back liner appears once one first portion 15 and third portion 17 and second portion 16 would have the liner 23 removed exposing adhesive 22. In this embodiment portion 15 and portion 17 can be equal in size though it is not necessary.

Figure 16:
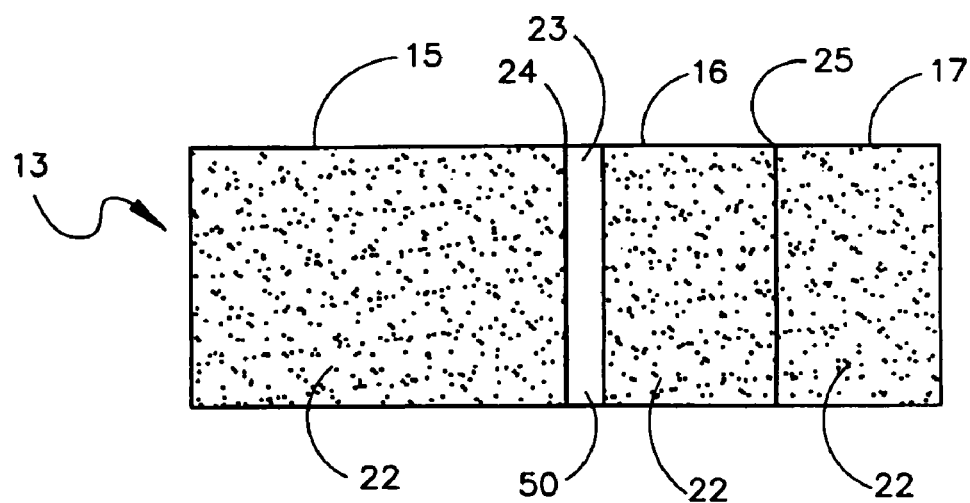
FIG. 16 is a rear view of the label of the sixth alternate embodiment of the present invention, corresponding to FIG. 17.
Figure 17:
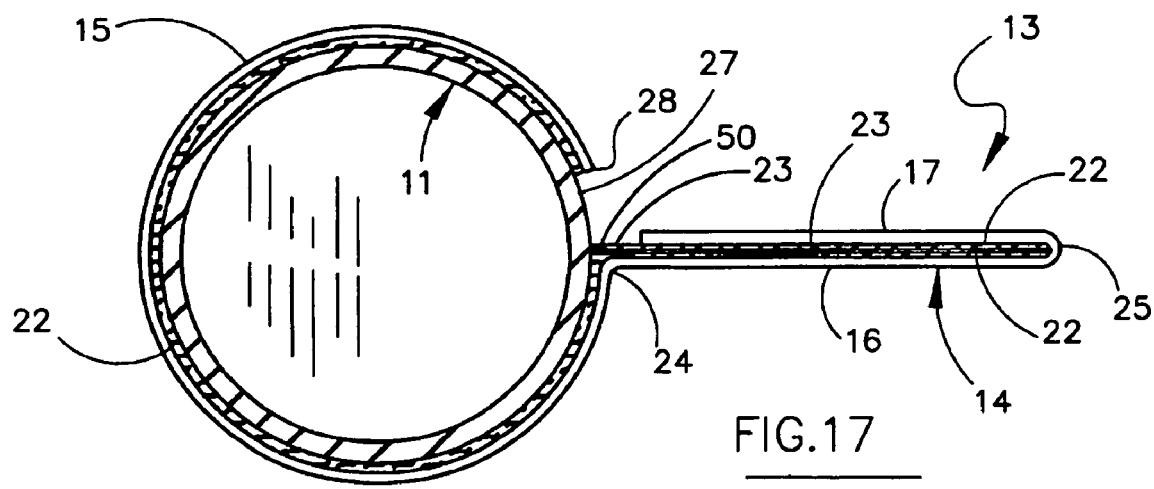
FIG. 17 is a sixth alternate embodiment shown in a sectional view similar to FIG. 2 that would be taken along lines 2-2 from FIG. 1.

FIGS. 16 and 17 show alternative embodiment having a sliver 50 which is a relatively thin vertical portion of back liner 23 in the vicinity of score 24. Sliver 50 will act as a stop guide when applying first portion 15 to container 11, when the back liner 23 is removed from second portion 16. Sliver 50 would be back-cut 2 vertically 2 horizontally, in liner 23 during manufacture of the label sheet 18.

In the alternative embodiments described herein, similar steps are taken to attach first portion 15 to container 11, and third portion 17 to second portion 16, where applicable.

Referring to FIG. 6, standard information would be included on first label portion 15 as generally known in the prior art. FIG. 6 also includes additional information not previously known, namely a pair of clocks, clock 37 and clock 38 shown in an icon-type format to indicate times of day when the medicine should be taken. Additionally clocks can also be used to show additional times during the day to take the medication.

Clocks 37 and 38 include an exterior circle 39, an indication within said circle 39 to indicate "am" or "pm." Also within each circle will be a specific number 40 to show the hour the medicine is to be taken, where said number 40 appears within the circle 39 at a relative corresponding location to the location of that time on a clock. The clocks in FIG. 6 are 12 hour clocks.

It is intended as shown in FIG. 6 that second portion 16 contains information from the manufacturer's database about the dispensed medicine. This information appearing on the information tab 14 would be provided by the manufacturer and would be automatically printed on label 13 based on the pharmacist's identification of the medicine when the pharmacist enters said identification into the pharmacist's computer system. The information on tab 14 is provided directly by the manufacturer or other information source so that the consumer (patient) can verify the information on label 13 to identify and compare said information with the medicine actually contained within container 11.

This information will include photographs or images of the dispensed medicine tablet for a visual comparison by the patient as well as the pharmacist and those working with the pharmacist. Typically, this photograph would be a first side view 41 and a second side view 42 of the image of the medicine. Other information may include, the NDCF numerical code 43, the product description (legal name) 44, the brand name of the medicine 45, the logo on the medicine 46, the color of the prescribed medicine 47, the shape of the prescribed medicine 48, and the brand name and the dosage amount or quantity of each tablet 49.

Additional information may include instructions from the manufacturer regarding how the consumer should consume the prescribed medicine which information would be included in one or more blocks contained on label 13.

The information on label 13 may be provided directly by the manufacturer so that the consumer (patient) can visually verify the physical attributes of the medicine received to the manufacturer's physical description of the attributes of the prescribed medicine by comparing the information on the container label with the actual prescribed medicine.

What is claimed is:

1. A pharmaceutical label for placement on a medicinal container comprising:
   a front printing face having an adhesive backing and a length that is substantially greater than a perimeter of the medicinal container, said adhesive backing covering substantially an entire area of the backside of the front printing face;
   a backing sheet liner covering said adhesive backing;
   said front printing face having a first portion and a second portion, said first portion having a length corresponding substantially to the perimeter of the container;
   a border between said first portion and said second portion, said border defining said length of said first portion;
   said backing sheet liner having a liner score line formed therein corresponding to said border, for removing said backing liner from said first portion and for defining an intact portion of said backing liner on said second portion, said second portion projecting from the container when said first portion is attached to the container; and
   said first portion and said second portion having information thereon.

2. The pharmaceutical label according to claim 1, wherein said border is a score line formed in said front printing face.

3. The pharmaceutical label according to claim 1, wherein a face of said backing sheet liner which faces away from said adhesive backing is formed of a material that can be printed on with a printer.

4. The pharmaceutical label according to claim 1, wherein said first portion has a first end and a second end and said label has a terminal end portion that is attached to the container between said first end and said second end.

5. A pharmaceutical label as in claim 1, wherein the label is a continuous strip of material with substantially planar surfaces.

6. A pharmaceutical label as in claim 1, wherein the label has a third portion and said third portion is folded back onto said second portion, forming an information tab and said tab extends radially from said container.

7. A pharmaceutical label as in claim 1, wherein said front printing face includes a further score line formed in said second portion which defines a third portion, said further score line defines a fold line between said second portion and said third portion.

8. The blank label sheet according to claim 7, wherein said backing sheet liner has a second liner score line formed therein which corresponds to said further score line for removing a portion of said backing sheet liner from said third portion, which allows said third portion to adhere to said second portion when said first portion is attached to the container.

9. A pharmaceutical label for placement on a medicinal container, the label comprising:
   a front printing face having an adhesive backing and a length that is substantially greater than a perimeter of the medicinal container, said adhesive backing covering substantially an entire area of a backside of the front printing face;
   a backing sheet liner covering said adhesive backing;
   said backing sheet liner having a liner score formed therein defining a first portion and a second portion of said front printing face, said first portion having a length corresponding substantially to the perimeter of the container, said liner score provided for removing said releasable backing liner from said first portion and said liner score defining a border between said first portion and said second portion, whereby said second portion projects from the container when said first portion is attached to the container.

10. The pharmaceutical label according to claim 9, wherein said first portion and said second portion have information thereon.

* * * * *